United States Patent [19]

Temme et al.

[11] Patent Number: 5,473,472

[45] Date of Patent: Dec. 5, 1995

[54] NIGHT VISION GOGGLE FOCUSING AID

[76] Inventors: Leonard A. Temme, 315 Gibbs Rd., Pensacola, Fla. 32507; David L. Still, 9841 Hollowbrook, Pensacola, Fla. 32514; Michael H. Mittelman, 5556 Ponte Verde Ct., Pensacola, Fla. 32507

[21] Appl. No.: 195,504

[22] Filed: Feb. 14, 1994

[51] Int. Cl.$^6$ .............................. G02B 23/16; G02B 27/40
[52] U.S. Cl. ........................ 359/600; 359/894; 359/900
[58] Field of Search ............................ 351/211; 359/428, 359/600, 894, 409

[56] References Cited

U.S. PATENT DOCUMENTS

| | | | |
|---|---|---|---|
| 3,418,908 | 12/1968 | Land | 95/45 |
| 4,168,429 | 9/1979 | Lough . | |
| 4,410,243 | 10/1983 | Fürste | 351/211 |
| 4,863,269 | 9/1989 | Ellis | 359/428 |
| 4,927,237 | 5/1990 | Hart | 359/894 |
| 4,943,151 | 7/1990 | Cushman | 351/211 |
| 4,997,269 | 3/1991 | Cushman | 351/211 |
| 5,089,914 | 2/1992 | Prescott | 359/894 |

FOREIGN PATENT DOCUMENTS 521138  5/1940  United Kingdom .

*Primary Examiner*—Martin Lerner
*Attorney, Agent, or Firm*—A. David Spevack; William C. Garvert

[57] ABSTRACT

An eye piece focusing aid provides improved focusing of an eye onto an intensified image screen of a NVG. A lens cap or blocking screen has two small holes (approximately one to two millimeters in diameter) which appear as a single hole when the retina of the eye is focused on the intensified image screen.

7 Claims, 4 Drawing Sheets

NIGHT VISION GOGGLE FOCUSING AID

BACKGROUND OF THE INVENTION

1. Field of the Invention

This invention is in the field of night vision goggles (NVG) or other optical devices which require the user to adjust an eyepiece in order to focus an image on the eye retina.

Night vision goggles are electro-optical instruments that have an adjustment for the focus of the intensified image at the viewing screen. The focus adjustment is made by adjusting the eyepiece lens which allows individuals with different eye focus characteristics to see the intensified image clearly, much like the adjustment for the eye found on microscopes and telescopes. For the purpose of an NVG, the eyepiece lens adjustment is required to provide the eye with a clear image of the intensified image on the viewing screen. The eyepiece focus in the NVG is distinct from the input focus of the optical system in that an image of the distant scene is on the photo cathode (FIG. 1).

It is known that NVG users have difficulty in correctly focusing the eyepiece lens. It is believed that the reasons that make it difficult to focus the adjustable eyepieces on most optical instruments are similar to the reasons for the difficulties associated with NVG applications.

For most optical instruments, inaccurate eyepiece lens focus, at worst, results in significant eye strain, headache, and diplopia; however, with the NVG, the eye strain, headache and related performance decrement are introduced into life and death situations. There is a consensus among Army, Air Force and Navy personnel that focusing of NVG devices produces a significant problem to which there is no consensus on solution.

2. The Prior Art

In the NVG prior art, the eyepiece lens is focused on the viewing screen. The user must adjust the focus for minimum smear or fuzziness, or for maximum contrast between different areas of the screen.

One solution to the focusing problems has been to completely eliminate the adjustable eye focus piece.

The use of small holes or slits for shielding the eye is known. British Patent 521,138 shows a device which has opaque eyepieces and small holes or slits in the centers for admission of a limited amount of light. In this device, the small hole or slit operates as a diaphragm, and not as a focusing aid.

The prior art also includes the work done by Christian Scheiner, reported in the year 1619. The Scheiner principle is illustrated in FIGS. 2–6. FIG. 2 shows a bundle of light 10 from an infinitely far point source that enters the lens 12 from the left and the lens focusing the bundle to the point 14 on the right. FIG. 3 repeats FIG. 2 with changes. Most of the lens has been made opaque, except for two small holes, i and ii. The opaque lens 12 blocks all light except that which passes through the holes. The holes are used to separate two pencils of light 16, 18 from the whole bundle 10. One light pencil passes through hole i and one passes through hole ii. These two pencils of light come together at the point of focus 14 of the lens, where the hole bundle would have been focused if the lens had been transparent.

FIGS. 4, 5 and 6 illustrate the effect the holes (i, ii) have when a focusing screen 20 is placed close to the lens (FIG. 4), at the focal plane (FIG. 5) or beyond the focal plane (FIG. 6).

FIG. 4 illustrates the situation when the screen is positioned at point A. The two bundles of light 16, 18 are isolated by a pair of holes i and ii which are projected onto the screen 20 at plane A. In this position, the screen has two separate images, the upper from hole i and lower from hole ii.

FIG. 5 illustrates the situation where the screen 20 is positioned at point B. The two bundles 16, 18 of light isolated by a pair of holes i and ii are projected onto the screen at plane B. If a screen is viewed, a single image is seen because of super imposed images from holes i and ii.

FIG. 6 illustrates a situation where the screen 20 is moved beyond the focal plane, 14 to a point C. This screen will be illuminated by two separate images, a lower image from hole i and an upper image from hole ii. This is the reverse of FIG. 4.

BRIEF DESCRIPTION OF THE INVENTION

This invention utilizes a pair of holes either in an objective lens cover or in an eyepiece cover. The pinholes are located at the same radial distance outward from the optical axis. In the case of the objective lens cover, and in the case of the eyepiece lens cover, the eyepiece of the NVG is adjusted to cause the spots of light produced by the holes to converge at the same location on the retina of the eye of a NVG user. When the spots of light are converged upon the retina at the same location, the NVG is focused at infinity.

DETAILED DESCRIPTION OF THE PREFERRED EMBODIMENT

This invention utilizes a pair of holes either in an objective lens cover or in an eyepiece cover. The pinholes arc located at the same radial distance outward from the optical axis. In the case of the objective lens cover, and in the case of the eyepiece lens cover, the eyepiece of the NVG is adjusted to cause the spots of light produced by the holes to converge at the same location on the retina of the eye of a NVG user. When the spots of light arc converged upon the retina at the same location, the NVG is focused at infinity.

The first embodiment utilizes a pair of holes in the objective lens cover designed to assist the user in properly focusing the objective lens of the NVG for distance objects. The second embodiment utilizes a pair of holes in the eyepiece lens cover designed to assist the NVG user in correctly focusing the eyepiece lenses to correspond with their refractive error.

The advantages gained by the first embodiment allow users of NVGs to accurately focus their devices on distant targets. Currently there is no way of determining where the objective lens is focused. This device allows accurate focusing of that lens. The advantages gained by the second embodiment allows the users of NVGs to accurately adjust their eyepiece lens, using objective visual cues, so that they do not sustain eyestrain while using the devices. There is currently no other accurate method of focusing the eyepiece lens which relies on objective visual cues.

Figure 4:
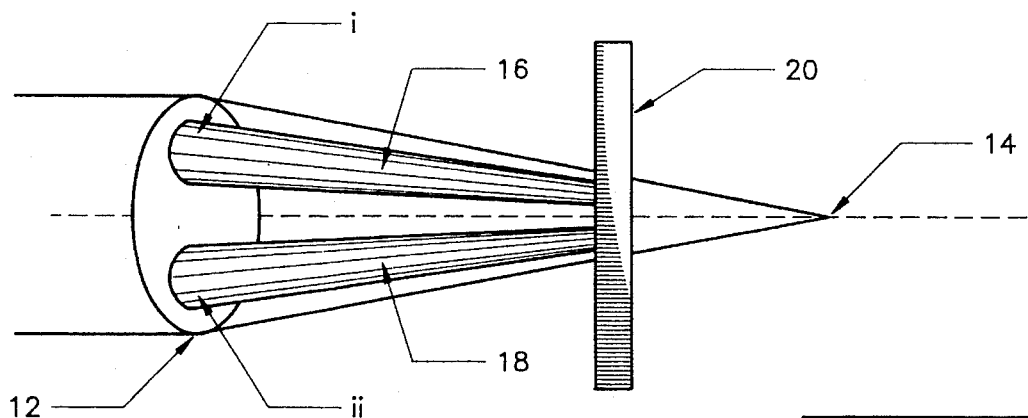
FIG. 4 illustrates the placement of a screen at a point A which is closer to the lens than the focus.
Figure 4A:
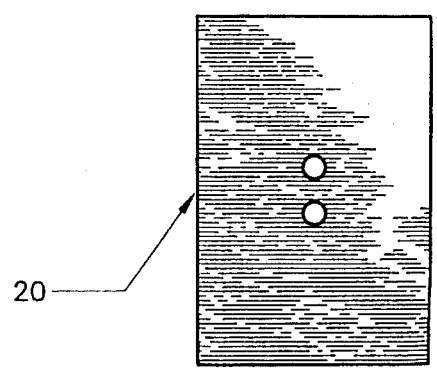
FIG. 4a shows the screen of FIG. 4.
Figure 5:
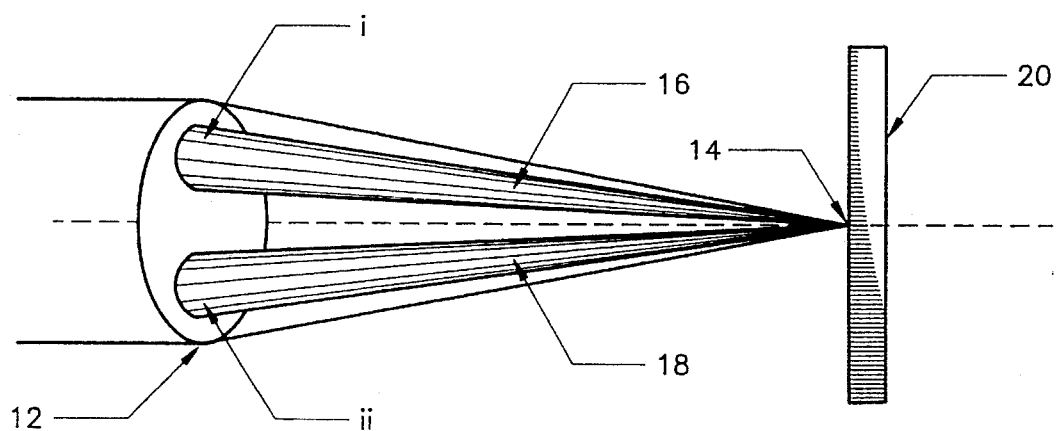
FIG. 5 shows a screen placed at point B which is at the focal plane.
Figure 6A:
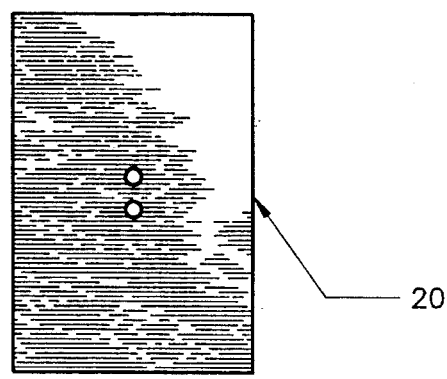
FIG. 6a shows the screen of FIG. 6.
Figure 5A:
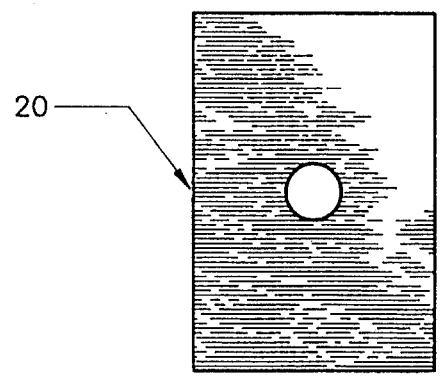
FIG. 5a shows the screen of FIG. 5.
Figure 6:
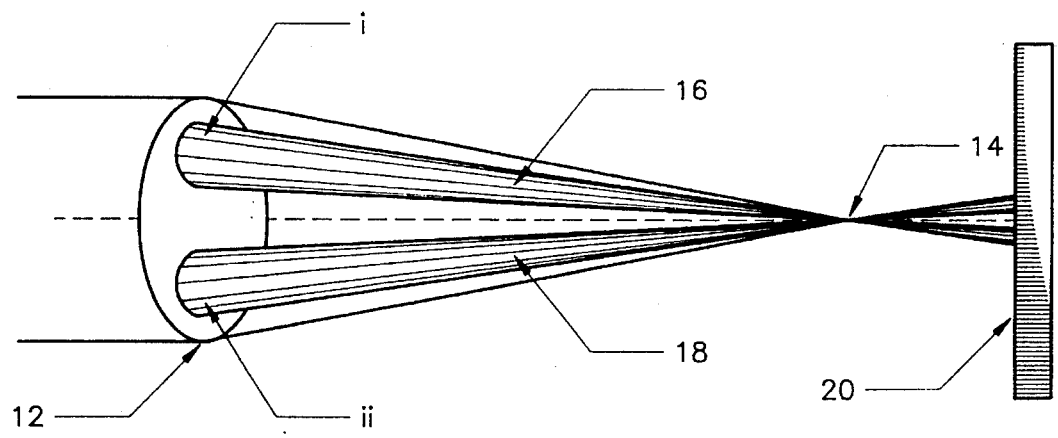
FIG. 6 shows a screen located at a plane C which is further from the lens than the focal plane.
Figure 7:
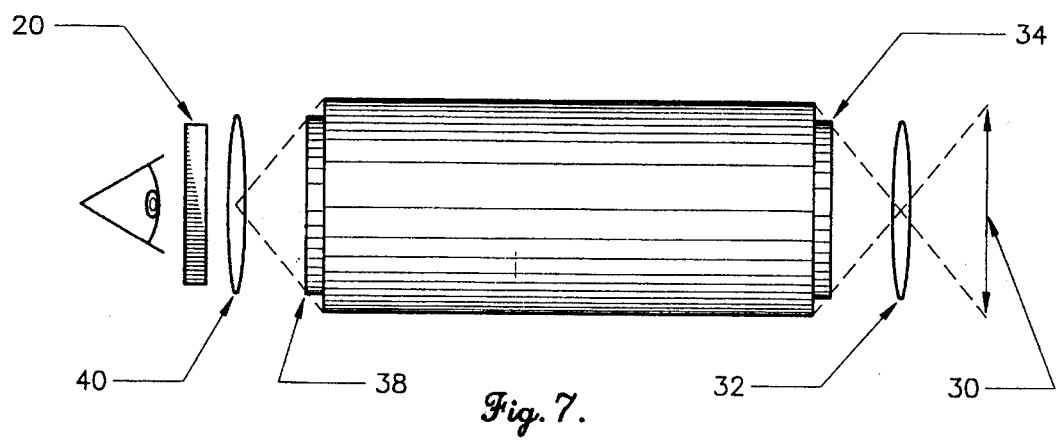
FIG. 7 shows a night vision goggle (NVG) with a focusing aid located between the human eye and the eyepiece lens.

In FIGS. 4, 5 and 6, it can be seen that the image formed on the retina of a human eye in a position as shown in FIG. 7 will be in a proper focused state when the eye sees a single dot (FIG. 5). The alignment of the two dots to form a single image on the eye retina is a clear and positive indication that the eye is focused upon the screen of the NVG.

Figure 1:
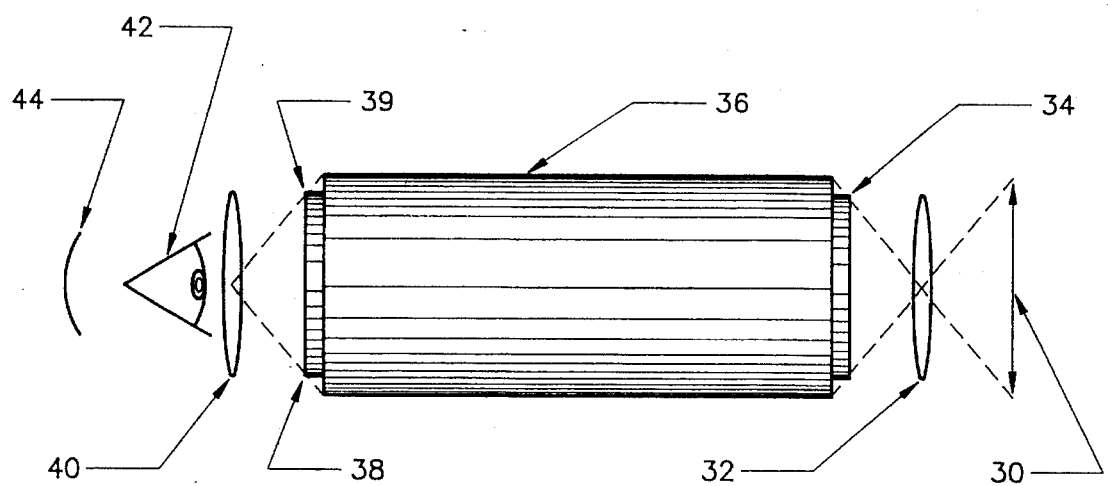
FIG. 1 shows a schematic of a night vision goggle (NVG) which may be used with this invention.
Figure 2:
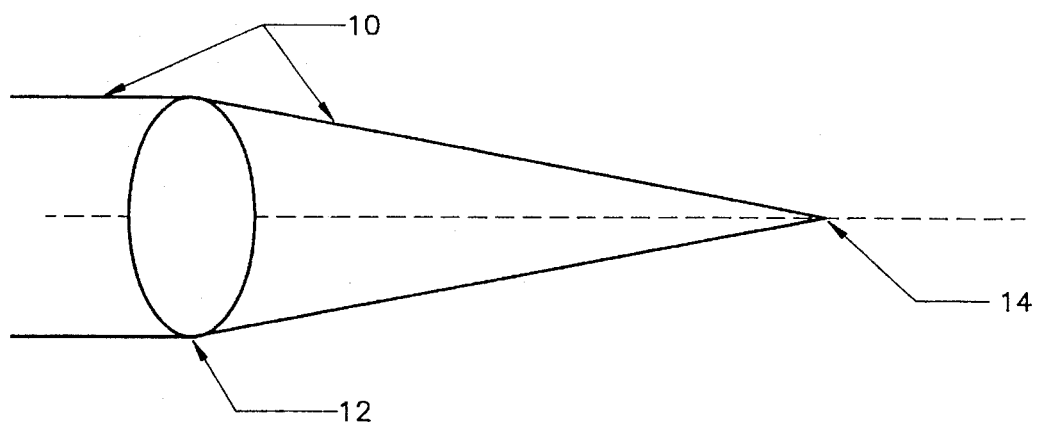
FIG. 2 shows focusing of parallel light beams at a point by a lens.
Figure 3:
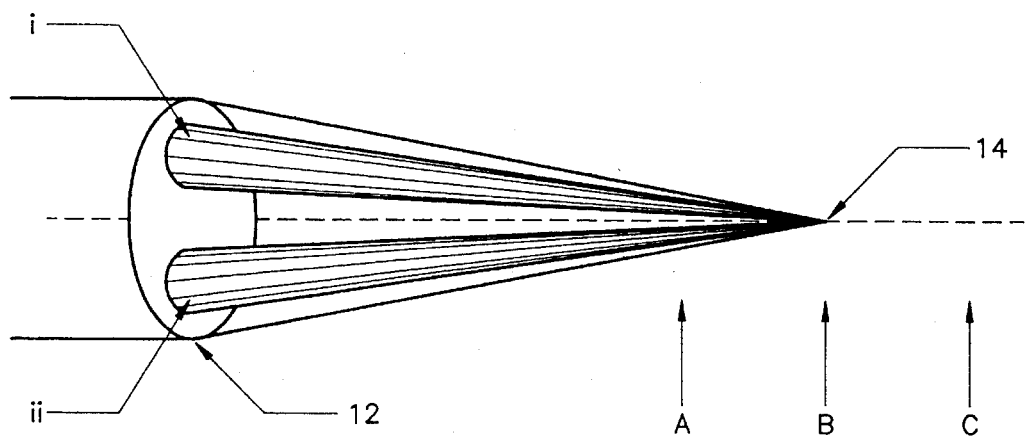
FIG. 3 illustrates the Scheiner principle.

The NVG schematic is shown in FIG. 1. An object 30 is focused on a photo cathode 34 by means of an objective lens 32. The amplification and inversion section 36 produces an intensified image 38 on a viewing screen 39. Eyepiece lens 40 is used for focusing the image on screen 39 on a retina 44 of a user's eye. The ocular lens of the user is identified as reference numeral 42. Adjustment of the position of the lens 40 is necessary in order to provide adjustment for different users having different ocular lenses and different lengths to the retina 44.

Figure 7A:
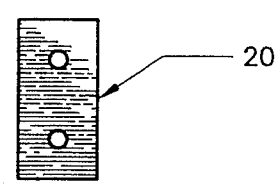
FIG. 7a shows the screen of FIG. 7.

In FIG. 7, there is shown the same night vision goggle arrangement as in FIG. 1, except that a screen 20 has been inserted between the user's eye lens 42 and the eyepiece adjusting lens 40. Two holes placed in the screen, as shown in FIG. 7a provided for the two separate pencils of light which enter the ocular lens of the user. The screen 20 may typically be two one millimeter holes placed closely together (within three millimeters) on a lens cap or other removable screen.

The alignment of the two dots into a single light image is more precise than aligning the eyepiece to the screen 20 and retina 44 by eliminating a fuzzy or blurred image on the screen.

In the NVG, when the pinholes are placed between the eye and ocular, the eye will only see one image when focus is correct. A user focusing the ocular lens of a NVG equipped with the eye lens focusing aid, adjusts the focus of the eye lens so that a single image of the intensified viewing screen is seen.

The focusing aid converts the focusing task from one of minimizing blur to one of aligning two images into a single image, a task that permits more precision. This is similar to image alignment used in photography.

As shown in FIG. 7, the eye lens focusing aid cap 20 has two pinholes. In FIG. 7, there is a single intensifier tube. When multiple intensifier tubes are used, there must be a separate eye lens focusing aid for each image intensifier and each needs to be focused independently. Therefore, a focusing aid cap is used with each intensifier tube individually. The size of the pinholes is not critical. However, they should not be smaller than one millimeter or larger than two millimeters. It is important to keep the distance between the two pinholes small enough so that light from both pinholes enters the eye's pupil at the same time. Since a typical eye might have a pupil size of five millimeters, the distance from one hole to another may be three or four millimeters. Still further, the pinholes should be centered and equally distant from the optical axis of the lens. There is, however, no reason to constrain the pinholes orientation to any particular position. The pinholes do not have to be aligned vertically or horizontally with respect to the vertical axis of the NVG.

Figure 8:
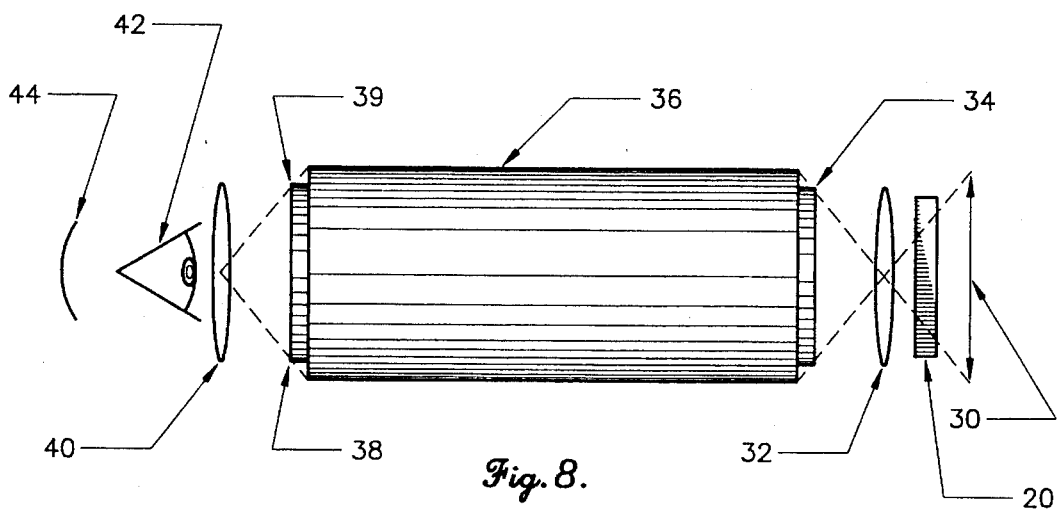
FIG. 8 shows a screen in front of the objective lens of a night vision goggle.
Figure 8A:
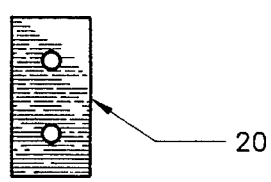
FIG. 8a is a front view of the screen 20.

The focusing aid lens cap with pinholes can also be used on the objective side of the NVG as shown in FIG. 8. Here, the pinholes receive parallel light from a distant source and after it passes through the NVG 36 it exits as parallel light to eyepiece lens 40. The two light pencils then converge to a single image on the eye retina 44 by adjusting the eyepiece 40.

What is claimed is:

1. A method of focusing an eyepiece of a night vision goggle comprising the steps of:

making a plurality of holes in a night vision goggle lens cover;

placing said night vision goggle cover over aid night vision goggle eyepiece lens; and adjusting the eyepiece of said light vision goggle to cause spots of light produced by said plurality of holes in said cover to converge at the same location on a night vision goggle user's retina.

2. The method according to claim 1 further comprising the step of placing said holes in a lens cap.

3. An apparatus for aiding focusing of an eyepiece of a night vision goggle comprising in combination;

in night vision goggle having an objective lens, an objective screen, a viewing screen and a light amplification means located between said objective lens and said viewing screen, and an eyepiece;

a cover placed over aid eyepiece lens, said cover having a plurality of pinholes for receiving light;

eyepiece adjusting means for focusing a viewer's eye on said viewing screen; and whereby adjusting said eyepiece causes said plurality of pinholes to appear as a single hole to a person looking into said night vision goggle when said night vision goggle focuses the viewing screen on a retina of said viewer.

4. An apparatus for focusing optical system at infinity comprising in combination:

an eyepiece of said apparatus wherein said eyepiece contains an objective lens for capture of parallel light from a point source at an infinite distance;

means for focusing light captured by said objective lens on a user's retina;

a plurality of light emitting holes in a cover placed over said objective lens; and means for adjusting the eyepiece of said apparatus whereby the user viewer can cause said plurality of holes to converge at a single location on the retina.

5. A method for focusing an eyepiece of a night vision goggle comprising the steps of:

making a plurality of holes in a night vision goggle lens cover;

placing said night vision goggle cover over an night vision goggle objective lens: and adjusting the eyepiece of said night vision goggle to cause spots of light produced by said plurality of holes in said cover to converge at the same location on a night vision goggle user's retina.

6. The method according to claim 5 further comprising the step of placing said holes in a lens cap.

7. An apparatus for aiding focusing of an eyepiece of a night vision goggle comprising in combination:

an night vision goggle having an objective lens, an objective screen, a viewing screen and a light amplification means located between said objective and said viewing screen, and an eyepiece;

a cover placed over said objective lens, said cover having a plurality of pinholes for receiving light;

eyepiece adjusting means for focusing a viewer's eye on said viewing screen; and whereby adjusting said eyepiece causes said plurality of holes to appear as a single hole to a person looking into said night vision goggle when said night vision goggle focuses the viewing screen on a retina of said user.

* * * * *